(12) United States Patent
Chippar et al.

(10) Patent No.: US 9,568,912 B2
(45) Date of Patent: Feb. 14, 2017

(54) AIRCRAFT PROGNOSTIC SYSTEMS AND METHODS FOR DETERMINING ADAPTIVE TIME BETWEEN OVERHAUL FOR LINE REPLACEABLE UNITS

(71) Applicant: HONEYWELL INTERNATIONAL INC., Morristown, NJ (US)

(72) Inventors: Purushothama Chippar, Karnataka (IN); Kishore John, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/739,322

(22) Filed: Jun. 15, 2015

(65) Prior Publication Data
US 2016/0362197 A1 Dec. 15, 2016

(51) Int. Cl.
G05B 23/02 (2006.01)
G07C 5/00 (2006.01)
G01S 19/13 (2010.01)
B64F 5/00 (2006.01)

(52) U.S. Cl.
CPC ......... *G05B 23/0283* (2013.01); *B64F 5/0045* (2013.01); *G01S 19/13* (2013.01); *G07C 5/006* (2013.01)

(58) Field of Classification Search
CPC ........ B64F 5/0045; G07C 5/006; G01S 19/13; G05B 23/0283
See application file for complete search history.

(56) References Cited

U.S. PATENT DOCUMENTS

| 6,219,597 | B1 * | 4/2001 | Longere | B64F 5/0045 701/32.9 |
|---|---|---|---|---|
| 7,719,416 | B2 | 5/2010 | Arms et al. | |
| 8,011,255 | B2 | 9/2011 | Arms et al. | |
| 8,229,622 | B2 | 7/2012 | Payne et al. | |

(Continued)

FOREIGN PATENT DOCUMENTS

| EP | 2154592 A1 | 2/2010 |
|---|---|---|
| EP | 2701025 A1 | 2/2014 |

(Continued)

OTHER PUBLICATIONS

Das S. et al.; Adaptive Prognostic Approaches Combining Regime Identification with Equipment Operating History; Global Training and Logistics; Lockheed Martin Orlando FL; 2010.

(Continued)

*Primary Examiner* — Dale W Hilgendorf
(74) *Attorney, Agent, or Firm* — Lorenz & Kopf, LLP (57) ABSTRACT

Prognostic systems and methods for providing adaptive Time Between Overhaul (TBO) value for one or more Line Replaceable Units (LRUs) are provided. In one embodiment, the LRU prognostic system includes a first LRU, an aircraft position data source configured to monitor the position of an aircraft carrying the LRU prognostic system, and a controller coupled to the first LRU and to the aircraft position data source. The controller is configured to: (i) estimate the degradation of the first LRU based at least in part on the duration of time the aircraft position resides in any one of a plurality of different environmental zones while the aircraft is operational, and (ii) calculate an adaptive TBO value for the first LRU utilizing the estimated LRU degradation.

20 Claims, 5 Drawing Sheets

(56) References Cited

U.S. PATENT DOCUMENTS

| | | | |
|---|---|---|---|
| 8,478,477 B2 | 7/2013 | Maisonneuve et al. | |
| 8,478,479 B2 * | 7/2013 | Ghelam | G05B 23/0283 701/31.9 |
| 8,594,924 B2 | 11/2013 | King et al. | |
| 8,666,569 B2 | 3/2014 | Goodrich et al. | |
| 8,774,988 B2 | 7/2014 | Plowman et al. | |
| 2007/0114280 A1 | 5/2007 | Coop et al. | |
| 2008/0086349 A1 * | 4/2008 | Petrie | G06Q 10/06 705/7.11 |
| 2011/0046996 A1 * | 2/2011 | Foucher | G05B 23/0283 705/7.11 |
| 2012/0143436 A1 | 6/2012 | Cornet et al. | |
| 2012/0266606 A1 | 10/2012 | Zeiner et al. | |
| 2013/0325286 A1 * | 12/2013 | Lacaille | G05B 23/0283 701/99 |
| 2014/0058594 A1 * | 2/2014 | Plowman | G05B 23/0275 701/33.4 |
| 2014/0214286 A1 | 7/2014 | Chandran et al. | |

FOREIGN PATENT DOCUMENTS

| | | | | |
|---|---|---|---|---|
| SE | EP 2345559 A1 * | 7/2011 | | B60R 25/00 |
| WO | 2009070347 A1 | 6/2009 | | |

OTHER PUBLICATIONS

Arms, S.W. et al.; Energy Harvesting, Wireless, Structural Health Monitoring and Reporting System; Materials Forum vol. 33—2009 © Institute of Materials Engineering Australasia Ltd. 2009.

Algera, D. et al.; Rotary Wing Structural Life Tracking Architecture; Presented at the American Helicopter Society 66th Annual Forum, May 11-13, 2010, Phoenix, Az.. Copyright © 2010 by the American Helicopter Society International, Inc.

S.G. Burrow et al. "Wireless sensors and energy harvesting for rotary wing aircraft Health and Usage Monitoring Systems," 2008, In Proc, Nanopower Forum, Costa Mesa, CA.

S.W. Arms et al. "Energy Harvesting, Wireless, Structural Health Monitoring and Reporting Systems," 2008, Lord MicroStrain published papers.

Extended EP Search Report for Application No. 16172767.2-1802 dated Jun. 10, 2016.

* cited by examiner

AIRCRAFT PROGNOSTIC SYSTEMS AND METHODS FOR DETERMINING ADAPTIVE TIME BETWEEN OVERHAUL FOR LINE REPLACEABLE UNITS

TECHNICAL FIELD

The present invention relates generally to aircraft and, more particularly, aircraft prognostic systems and methods for determining adaptive Time Between Overhaul (TBO) values for one or more line replaceable units.

BACKGROUND

Modern aircraft are commonly equipped with a relatively large number of Line Replaceable Units (LRUs), which perform various functions supporting aircraft operation. By definition, LRUs are modular components that can be removed and replaced in-field in a relatively efficient manner to, for example, minimize downtime of the aircraft during maintenance, such as during an unplanned maintenance event and repair. To reduce the likelihood of in-field LRU failure, LRUs are often replaced and overhauled after expiration of a so-called "Time Between Overhaul" or "TBO" value assigned to the LRU. The TBO value is a fixed period, which is typically measured in flight hours and set by the Original Equipment Manufacturer (OEM) during initial design of the LRU. The OEM may determine the TBO value of a particular LRU based upon a number of different factors. These factors may include the structural characteristics of the LRU (e.g., the base materials of the LRU, the presence of rubber seals and gaskets, the provision of coatings or coating systems, etc.), the mechanical stressors to which the LRU may be exposed (e.g., expected vibration and stress concentrations), and the range of operational environments in which the LRU may potentially be deployed.

BRIEF SUMMARY

Embodiments of a Line Replaceable Unit (LRU) prognostic system are provided. In one embodiment, the LRU prognostic system includes a first LRU, an aircraft position data source configured to monitor the position of an aircraft carrying the LRU prognostic system, and a controller coupled to the first LRU and to the aircraft position data source. The controller is configured to: (i) estimate the degradation of the first LRU based at least in part on the duration of time the aircraft position resides in any one of a plurality of different environmental zones while the aircraft is operational, and (ii) calculate an adaptive Time Between Overhaul (TBO) value for the first LRU utilizing the estimated LRU degradation.

In a further embodiment, the LRU prognostic system includes a first LRU and a Radio Frequency Identification (RFID) module, which is embedded within or otherwise affixed to the first LRU. The RFID module contains an LRU memory, which stores a baseline TBO value, degradation rates corresponding to a plurality of different environmental zones, an adaptive TBO value, and possibly other LRU usage-related data. The LRU prognostic system further incudes a calculation sub-system coupled to the first RFID module. The calculation sub-system is configured to periodically update the adaptive TBO value by estimating the degradation of the first LRU based at least in part on the duration of time the aircraft position is located in the plurality of different environmental zones and the degradation rates associated therewith, as recalled from the RFID module. Additionally, the calculation sub-system calculates a new adaptive TBO value from the estimated LRU degradation and then stores the new adaptive TBO value in the LRU memory. This process can be repeated to periodically update the adaptive TBO value at predetermined intervals or events, such as each time the LRU has been operated in flight.

Further provided are embodiments of a method for determining an adaptive TBO value for a first LRU. The method is carried-out by the controller of a LRU prognostic system deployed onboard an aircraft. In an embodiment, the method includes the step or process of estimating, at the controller, the degradation of the first LRU based at least in part on the duration of time the aircraft position resides in any one of a plurality of different environmental zones. Further, the adaptive TBO value for the first LRU is calculated at the controller utilizing the estimated LRU degradation.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

As noted in the foregoing section entitled "BACKGROUND," a Line Replaceable Unit (LRU) is commonly assigned a fixed Time Between Overhaul (TBO) value or period by the Original Equipment Manufacturer (OEM) during the initial design stage of the LRU. As the OEM lacks prior knowledge of the particular environmental conditions to which the LRU will be exposed over its impending service life, the OEM will typically set the TBO value based upon an anticipated range of operational conditions to which the LRU may reasonably be subjected. This practice of setting a fixed LRU TBO value, which does not change or adapt in relation to the actual environmental exposure of the LRU, can result in an unnecessary increase in maintenance costs, can contribute to an inefficient scheduling of inspections, and can negatively impact LRU reliability and, therefore, the overall reliability of the larger aircraft systems.

Consider, for example, a scenario in which an LRU-equipped aircraft operates primarily or exclusively in mild environmental conditions, such as high humidity or ice-rich conditions. In this case, the LRUs carried by the aircraft may be subject to a relatively low rate of environmental degradation and, thus, be capable of providing useful service life well beyond the fixed TBO value assigned by the OEM. Consequently, replacement of the LRUs upon expiration of the manufacturer-set TBO value incurs unneeded maintenance costs and can contribute to inefficient or sub-optimal maintenance scheduling. Conversely, in instances wherein the LRU-equipped aircraft primarily or exclusively operates in exceptionally harsh environmental conditions, such as high salinity or coastal conditions, replacement of the LRUs prior to the expiration of their respective manufacturer-set TBO values may be warranted. In such instances, there may exist an undesirably high probability of LRU failure immediately prior to expiration of the fixed manufacturer-set TBO thereby decreasing the overall reliability of the aircraft systems. Further complicating this problem is the fact that a single LRU can be deployed on multiple different aircraft over the lifespan of the LRU.

To overcome the above-described limitations associated with the usage of a fixed or manufacturer-set TBO values, the following describes aircraft prognostic systems and methods enabling a variable or "adaptive" TBO value to be calculated an for one or more LRUs deployed onboard an aircraft and periodically updated at predetermined intervals or upon occurrence of a particular event, such as upon completion of a flight operation. The adaptive TBO value may be derived from a baseline TBO value, such a manufacturer-set TBO value, which is adjusted based upon an estimated degradation of the LRU. The estimated degradation of the LRU can be determined, in turn, by monitoring the cumulative period of time the aircraft resides in any one of a plurality of different geographically-divided zones, each having a particular LRU degradation rate associated therewith. The environmental degradation rates correlated to the geographical zones may be LRU-specific and recalled from a memory embedded in the LRU. Additionally, in certain embodiments, the degradation rates can be adjusted based upon sensor input monitoring the health of the LRU. The adaptive TBO value may then be stored on, for example, memories affixed to each LRU and, preferably, memories included in Radio Frequency Identification (RFID) devices embedded into each LRU. In this manner, the adaptive TBO value can be readily retrieved from the LRU even in instances wherein the LRU is deployed on multiple different aircraft over its operational lifespan. The adaptive TBO value can be updated at a relatively rapid refresh rate or upon occurrence of a particular event (e.g., aircraft shutdown) to ensure that the TBO value reflects the actual environmental exposure of the LRU in real-time or near real-time.

Figure 1:
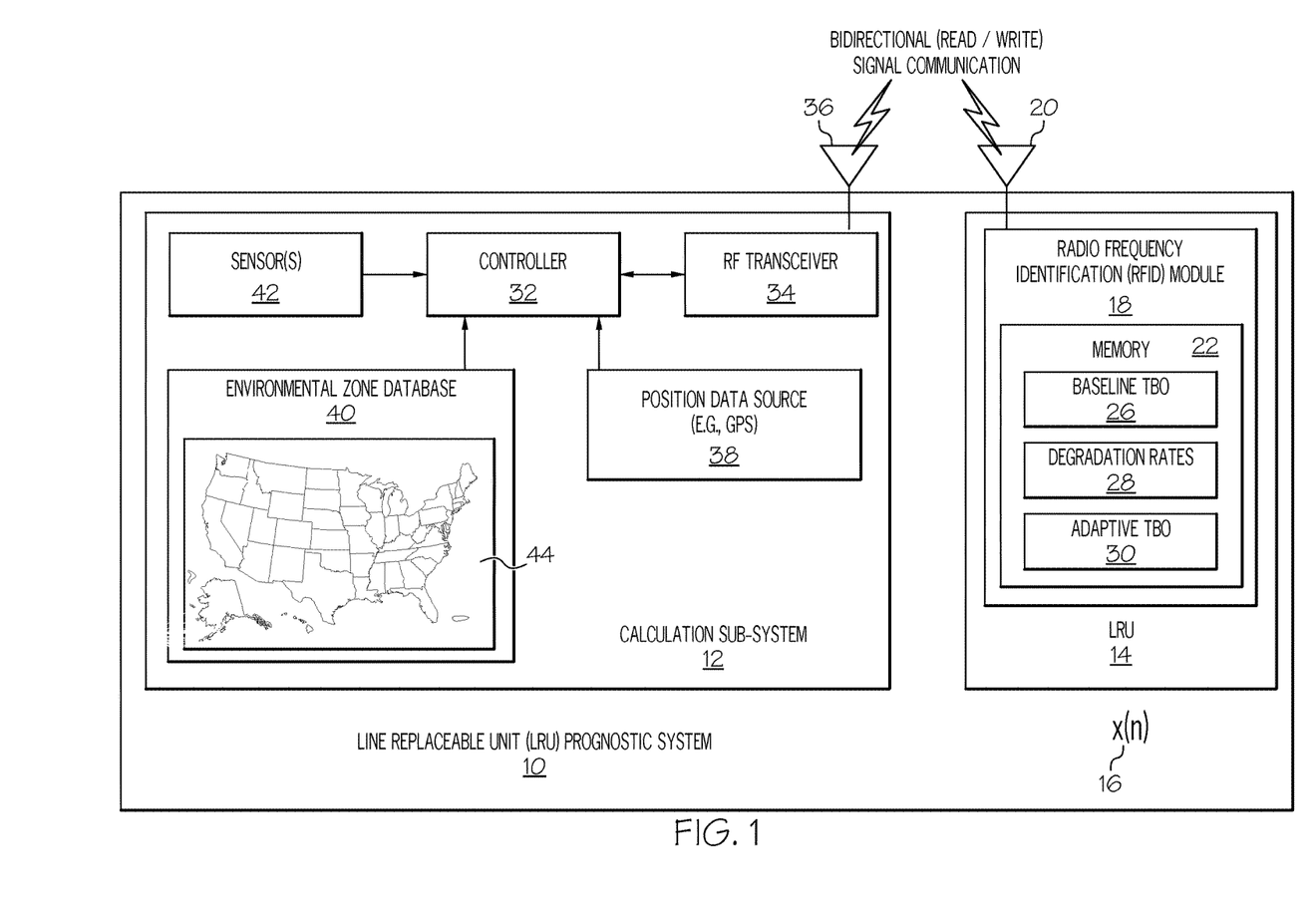
FIG. 1 is a block diagram of a Line Replaceable Unit (LRU) prognostic system, as illustrated in accordance with an exemplary embodiment of the present invention.

FIG. 1 is a schematic of an LRU prognostic system 10 deployed onboard an aircraft, such as a rotary wing aircraft, as illustrated in accordance with an exemplary embodiment of the present invention. LRU prognostic system 10 includes a calculation sub-system 12, a first LRU 14, and any number of additional LRUs (indicated FIG. 1 by symbol 16). LRU prognostic system 10 can include or be utilized in conjunction with various different types of LRUs. A non-exhaustive list of LRUs suitable for usage within system 10 includes certain engines, transmission units, heat exchangers, pumps (e.g., oil pumps, fuel pumps and fuel controls, etc.), cooling fans, valves (e.g., surge control valves, fuel metering valves, bleed air valves, etc.), starter motors, ignition control units, and wiring harnesses. LRU prognostic system 10 is advantageously deployed onboard a rotary wing aircraft or helicopter, but may also be deployed onboard a fixed wing aircraft.

In the exemplary embodiment illustrated in FIG. 1, LRU 14 includes a Radio Frequency Identification (RFID) module 18 (also commonly referred to as an "RFID tag"). RFID module 18 may be affixed to the housing of LRU 14 during original manufacture or as a retrofit installation; the term "affixed" encompassing mounting of the RFID module 18 to the exterior of LRU 14, as well as integration or embedment of RFID module 18 within LRU 14. RFID module 18 contains an RFID antenna 20, which allows wireless bi-directional communication with an LRU memory 22 further contained within module 18. LRU memory 22 can assume any form suitable for storing data of the type described below. LRU memory 22 is conveniently implemented as a solid state, non-volatile memory, such as flash memory. In one embodiment, memory 22 is realized utilizing Electrically Erasable Programmable Read-Only Memory (EEPROM). In the illustrated example, RFID module 18 is passive and, thus, utilizes the energy obtained from a read/write signal or interrogation to perform the desired actions. However, in further embodiments, RFID module 18 can be active and may include a power source (not shown), such as a power storage device (e.g., a battery or super capacitor), an energy harvesting device, or a wired connection to the LRU power feed.

As schematically indicated in FIG. 1, LRU memory 22 preferably stores at least three different types of data pertaining to embodiments of the present invention: (i) baseline TBO value 26, (ii) degradation rates 28 assigned to a plurality of different environmental zones, and (iii) an adaptive TBO value 30. Each of these different types of data can be stored in a separate sector or area of memory 22; however, this need not always be the case. Baseline TBO value 26 is a fixed or constant TBO value, which may be set by the OEM or another entity during original manufacture of LRU 14. Degradation rates 28 represent different rates of degradation that are assigned to a number of environmental zones. For example, a first degradation rate of $D_1$ may be assigned to a high salinity environment, a second degradation rate of $D_2$ may be assigned to a high humidity environment (with $D_2$ being less than $D_1$), and so on. Here, it will be noted that the environmental zones degradation rates may be specific to LRU 14; and a different type of LRU included in system 10 may have a different set of environmental zone degradation rates associated therewith. Finally, adaptive TBO value 30 represents the TBO value calculated for LRU 14 based upon the estimated degradation and actual environmental of LRU 14. TBO value 30 can be calculated as a function of the baseline TBO value, the amount of time the aircraft operates in a particular environmental zone or zones, and the degradation rates associated with those zone(s), as described below. It will be appreciated that LRU memory 22 can also store other data (e.g., maintenance log information) in addition to baseline TBO value 26, degradation rates 28, and adaptive TBO value 30 in some implementations.

With continued reference to the exemplary embodiment shown in FIG. 1, calculation sub-system 12 includes a controller 32, an RF transceiver 34 having an RF antenna 36, an aircraft position data source 38, and an environmental zone database 40. Additionally, in certain embodiments, calculation sub-system 12 may include one or more sensors 42 for monitoring parameters pertaining to the health or degradation of LRU 14. Controller 32 can include any suitable number of individual microprocessors, microcontrollers, digital signal processors, programmed arrays, and other standard components known in the art. Controller 32 may include or cooperate with any number of software or firmware programs designed to carry out the various methods, process tasks, calculations, and control functions described herein. RFID transceiver 34 can assume any form enabling wireless communication with antenna 20 of RFID module 18, preferably over an Ultra High Frequency (UHF) bandwidth. Aircraft position data source 38 can assume any form suitable for tracking aircraft position, such as a Global Positioning System (GPS). Finally, when present, sensor(s) 42 can be any type of sensor suitable for measuring parameters contributing to LRU degradation or health, such as vibration sensors, temperature sensors, chemical sensors, wear sensors, and the like. While illustrated as part of sub-system 12 in FIG. 1, it will be appreciated that sensor(s) 42 can be attached to or embedded within LRU 14 in further embodiments.

Figure 3:
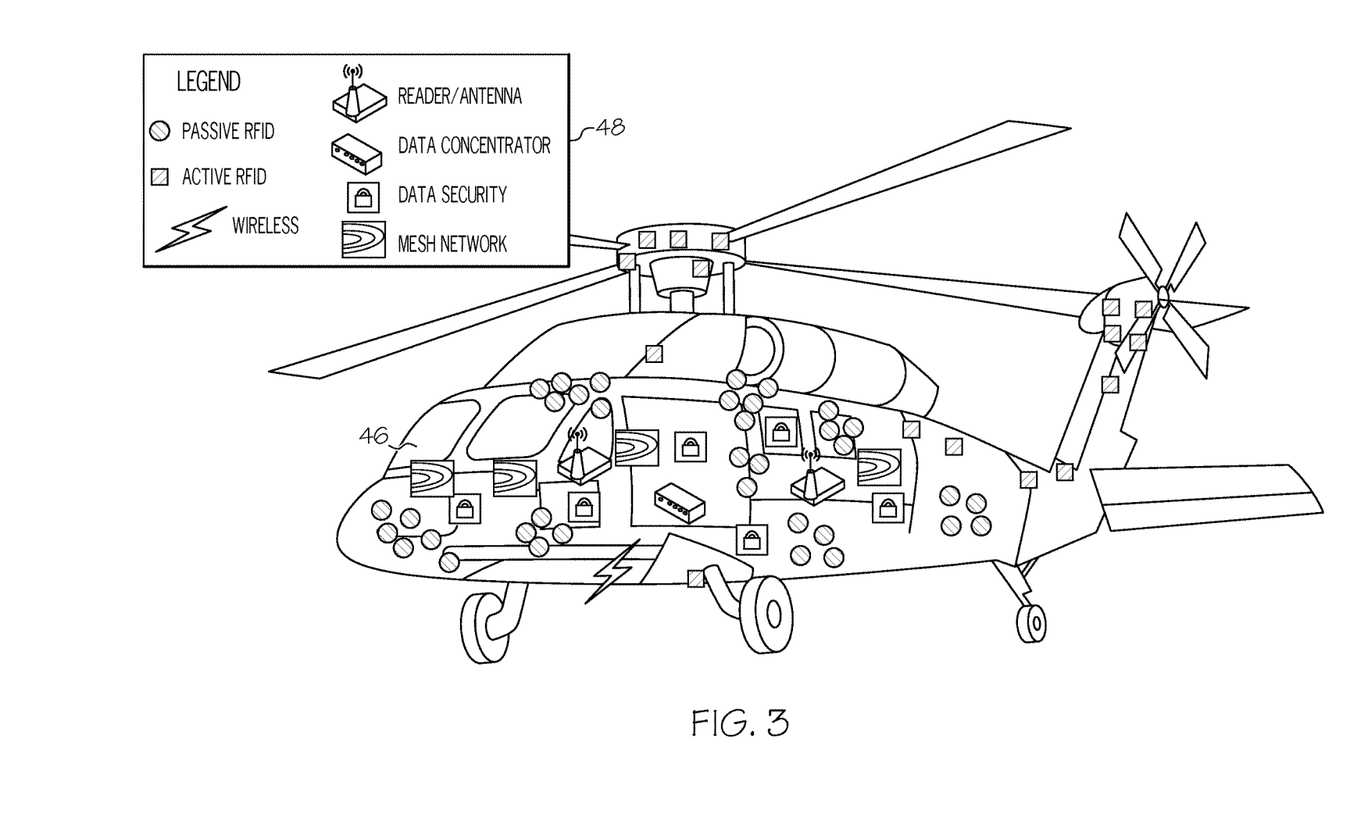
FIG. 3 is an isometric view of a rotary wing aircraft including a plurality of LRUs having Radio Frequency Identification (RFID) modules embedded therein, which can further be included in an exemplary implementation of the LRU prognostic system shown in FIG. 1.

As indicated in FIG. 1 by graphic 44, environmental zone database 40 stores information correlating a wide range of geographic positions or coordinates (latitude and longitude) to a number of different environmental zones having disparate influences on the degradation rate of LRU 14 and the other LRUs included in system 10 (see FIG. 3). The information in database 40 can be stored as, for example, a map or a two-dimensional look-up table, which encompasses the operational range of the aircraft. As previously stated, the environmental zones are preferably classified by environmental characteristics affecting (accelerating or decelerating) the rate of LRU degradation. Examples of different environmental zones that may have varying effects on LRU degradation rates are saline, high humidity, desert, hot zones, and ice-rich zones, to list but a few examples.

During operation of LRU prognostic system 10, controller 32 periodically calculates an adaptive TBO value for LRU 14 and any other LRUs included in prognostic system 10. For ease of explanation, the following description will focus primarily on the manner in which prognostic system 10 determines the adaptive TBO value for LRU 14. It will be appreciated, however, that prognostic system 10 can simultaneously determine the adaptive TBO value for any number of additional LRUs utilizing the process described herein, such as the other LRUs shown in FIG. 3 (described below). In general, controller 32 of LRU prognostic system 10 will calculate the adaptive TBO value for LRU 14 utilizing an estimated LRU degradation value, which is determined, based at least in part, on the duration of time the aircraft position resides in any one of a plurality of different environmental zones while the aircraft is operational. Controller 32 preferably estimates the degradation of the first LRU as a function of duration of time the aircraft position is located in the plurality of different environmental zones and the degradation rates corresponding to those zone(s), as recalled from LRU memory 22. The duration of time LRU 14 and, more generally, the aircraft carrying LRU 14 is located in each of the environmental zones can be determined by correlating the aircraft position (as monitored by aircraft position data source 38) with the plurality of different environmental zones (as stored in environmental zone database 40), as further described below in conjunction with FIG. 5.

Figure 2:
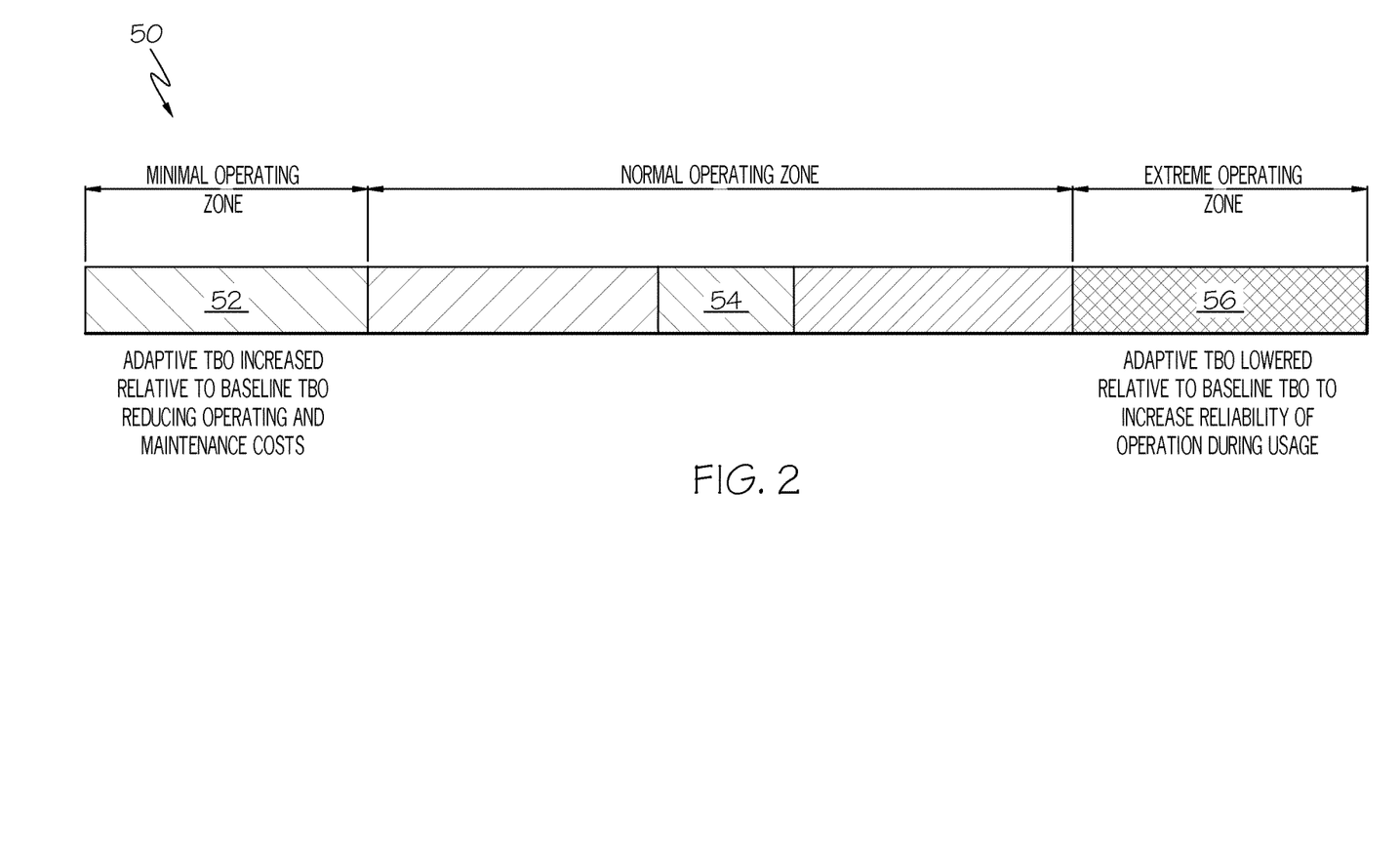
FIG. 2 is an operative use spectrum illustrating an exemplary manner in which the adaptive TBO value for one or more LRUs can be adjusted relative to a baseline TBO value based, at least in part, upon the environmental exposure of an aircraft carrying the LRU(s)

FIG. 2 is an LRU usage spectrum 50 generally illustrating the manner in which the adaptive TBO value varies depending upon the operating environment of the aircraft carrying LRU 14 and any other LRUs included within system 10. LRU usage spectrum 50 is divided into three segments: (i) a minimal operating segment 52, which is characterized by operation in relatively mild environmental conditions; (ii) a normal operating segment 54, which is characterized by operation in moderate to slightly harsh environmental conditions; and (iii) an extreme operating segment 56, which is characterized by operation in harsh environmental conditions. In an embodiment wherein the baseline TBO value of LRU 14 is, for example, 2000 flight hours, the adaptive TBO value stored in LRU memory 22 may initially be equivalent to the baseline TBO value. If the aircraft carrying LRU 14 is operated primary or exclusively in an environment having an accelerated degradation factor connected therewith, such as a saline environment, the adaptive TBO value will gradually decrease relative to the baseline TBO value. For example, the adaptive TBO value may call for replacement of the LRU 14 at 1500 flight hours. By replacing LRU 14 at this time, the reliability of LRU 14 may be increased, as indicated in the lower right portion of FIG. 2. To provide a contrasting example, if the aircraft carrying LRU 14 is operated primary or exclusively in an environment having a decelerated degradation factor, such as a high humidity or ice-rich environment, the adaptive TBO value will gradually increase relative to the baseline TBO value. For example, the adaptive TBO value may call for replacement of the LRU 14 at 2500 flight hours. By replacing LRU 14 in accordance with the adaptive TBO value, which is extended relative to the baseline TBO value, premature replacement of LRU 14 is avoided thereby reducing cost and the performance of unneeded maintenance, as indicated in the lower right portion of FIG. 2.

In actual implementations, LRU prognostic system 10 will typically include a relatively large number of LRUs in which both passive and active RFID modules or tags are embedded. Furthermore, various different architectures can be utilized enabling communication between the calculation sub-system 12 and RFID module 18. For example, a communication gateway can be utilized to facilitate communication between sub-system 12, RFID module 18 on LRU 14, and the RFID modules contained with any other non-illustrated LRUs included in system 10. Further emphasizing this point, FIG. 3 is an isometric view of a rotary wing aircraft 46 (partially shown) equipped with an LRU prognostic system, which may be considered an implementation of LRU prognostic system 10 (FIG. 1) for purposes of the following description. In the implementation shown in FIG. 3, the LRU prognostic system includes a reader or antenna (represented by a first symbol in key 48), a data concentrator or gateway (represented by a second symbol in key 48), and a number of passive and active RFID modules (represented by third and fourth symbols in key 48, respectively) distributed throughout the aircraft. The LRU prognostic system may also include a mesh network and a number of wireless connections, as further indicated by key 48. Rotary wing aircraft 46 includes a relatively large number of LRUs containing embedded RFID tags and may consequently be referred to as an "RFID enabled aircraft."

In the embodiment shown in FIG. 3, the degradation of LRUs can be calculated in real time and stored in the memories of the respective LRU tags in the following manner. As indicated above, there may be several read/write devices installed throughout aircraft 46 to provide read/write facilities to the RFID modules via a wireless communication mode. The read/write devices can be connected to the gateway via the wireless (e.g., RF) connection shown in FIG. 3. In a preferred embodiment, the gateway is the only mechanism connected to an external mode in a wireless Local Area Network (LAN), via Ethernet, or via another connection. The calculation sub-system (e.g., sub-system 12 shown in FIG. 1) can likewise be connected to gateway wirelessly or via an Ethernet connection. As noted above, each LRU RFID tag may contain three distinct storages or memory sectors. A first memory sector stores degradation rates of the LRU under different environmental conditions, such as saline, desert, high humidity, ice operation, and the like. The second memory sector stores the baseline TBO, which may be set by the manufacturer. The third memory sector may store the adaptive TBO. The adaptive TBO may initially be equivalent to the baseline TBO and change over the operational lifespan of the LRU in accordance with an algorithm hosted by calculation sub-system 12 (FIG. 1), as generally described below in conjunction with FIGS. 4-6.

Figure 4:
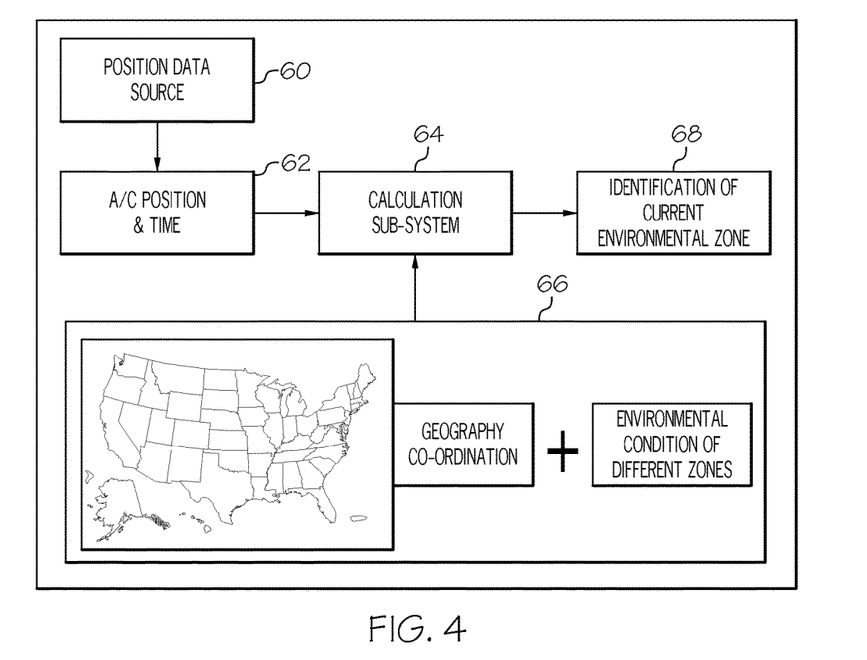
FIGS. 4, 5, and 6 are schematic diagrams illustrating operation of the LRU prognostic system shown in FIGS. 1 and 3 in aircraft start-up, in-flight, and aircraft shut-down modes, respectively, as illustrated in accordance with a further exemplary embodiment of the present invention.

By way of non-limiting example, controller 32 of LRU prognostic system 10 can update the adaptive TBO value for each LRU utilizing a three stage process. The first stage occurs during power-up or start-up of the aircraft, the stage second occurs during flight of the aircraft, and the third stage occurs during aircraft shut down. The first, second, and third stages are illustrated conceptually in FIGS. 4-6, respectively. Referring initially to FIG. 4, during the first stage (aircraft start-up condition), controller 32 initially retrieves the current aircraft position and start-up time of the aircraft from aircraft position data source 38 (BLOCKS 60 and 62). In an embodiment wherein position data source 38 is an aircraft GPS, controller 32 can directly retrieve this information from the GPS device or avionics. Afterwards, controller 32 recalls the coordination of aircraft position and environmental zones from environmental zone database 40 (BLOCK 66). Controller 32 or, more generally, calculation subsystem 12 then identifies the environmental zone corresponding to the present aircraft position from the data recalled from environmental zone database 40 (BLOCKS 66 and 68).

Figure 5:
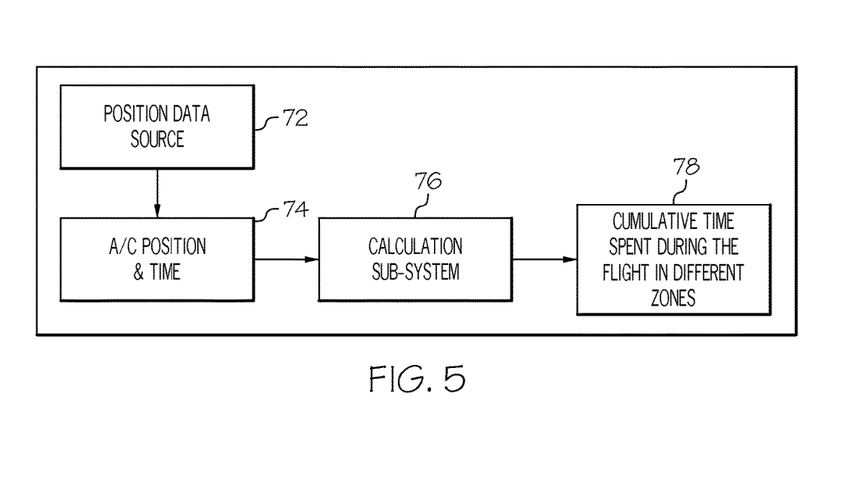
Figure 6:
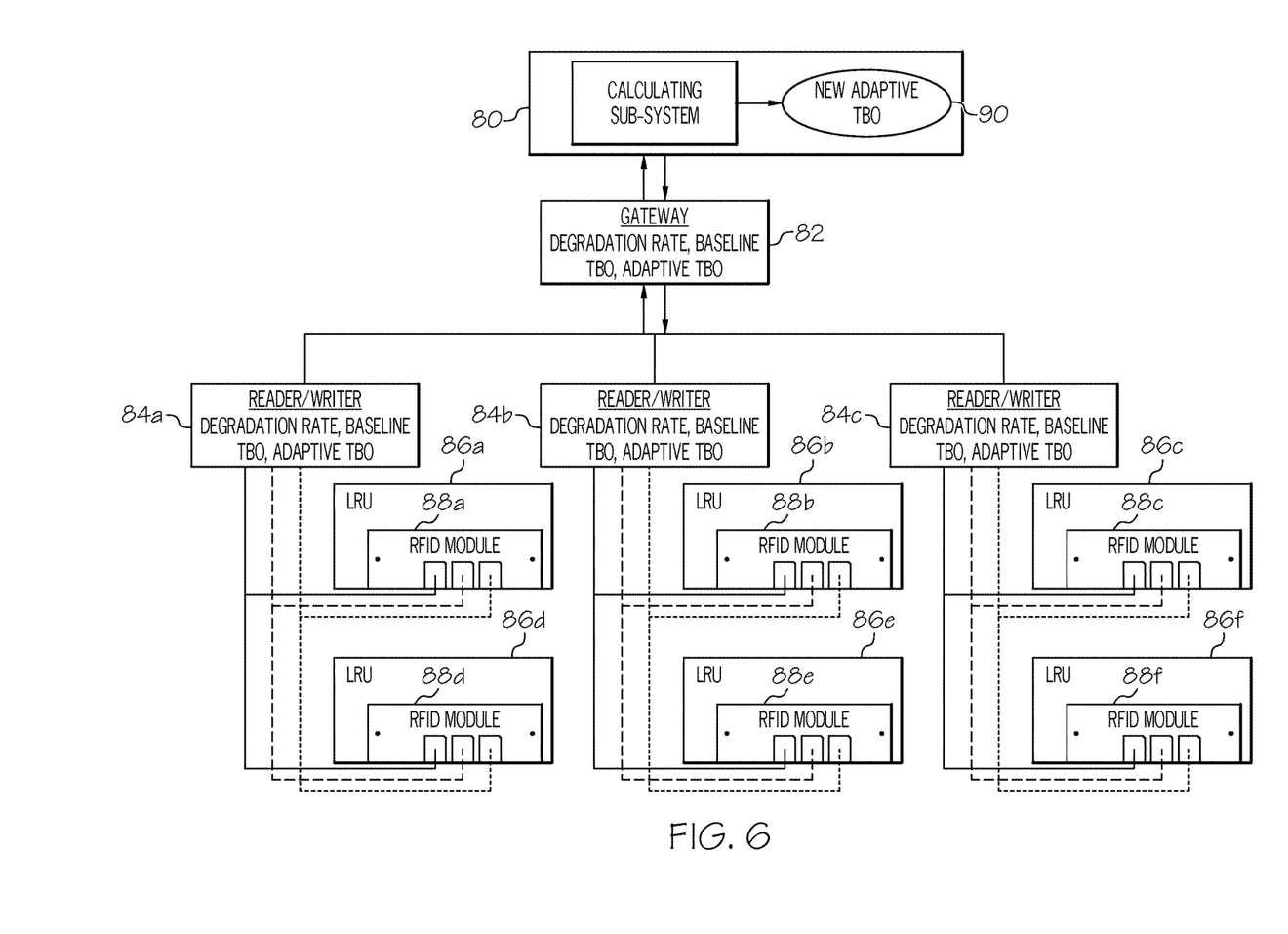

FIG. 5 illustrates the second stage or operational mode (in-flight condition) in which controller 32 of LRU prognostic system 10 (FIG. 1) may operate. During this stage, controller 32 periodically retrieves aircraft position and time data from aircraft position data source 38 (BLOCKS 72 and 74), which, again, may include a GPS device. Controller 32 then compares the updated aircraft position data to the position-to-environmental zone data stored in environmental zone database 40 to determine whether the aircraft remains in the previously-identified environmental zone or has transitioned into a new environmental zone. Utilizing this information, the calculation sub-system 12 then determines the cumulative time period of the aircraft and, therefore, the LRU or LRUs contained within LRU prognostic system 10 (FIG. 1) resides in or is operated in each environmental zone (BLOCKS 76 and 78).

The third and final stage of the process carried-out by controller 32 (FIG. 1) will typically occur after landing during shut down of the aircraft. During this stage, calculation sub-system 12 performs the following steps conceptually illustrated in FIG. 6. First, calculation sub-system 12 forwards a request to gateway 82 to fetch (read data) the LRU-specific degradation rates and adaptive TBO value from each LRU (identified as 86(a)-(f) in FIG. 6). After this data has been recalled, calculation sub-system 12 may create a zonal map or table. The calculation sub-system 12 then utilizes this map or table, along with the previously-determined cumulative time period the aircraft position resides in different environmental zones while operational, to calculate a new adaptive TBO value 90 for each LRU 86(a)-(f), as indicated in BLOCK 80 of FIG. 6. Finally, calculation sub-system 12 forwards requests to gateway 82 to write the new adaptive TBO value to the memories contained within the respective LRUs' RFID modules 88(a)-(f) utilizing read/write devices 84(a)-(c). This can include, for example, memory 22 included in RFID module 18 of LRU 14 shown in FIG. 1. As noted above, the zone-dependent degradation rates of the LRUs can be fixed by the manufacturer or operator. Alternatively, the degradation rates of LRUs 86(a)-(f) can be varied based upon the environmental conditions to which the aircraft is subjected. In this the regard, the degradation rates of LRUs 86(a)-(f) can be determined in real time or near real time using LRU health data (e.g., wear, torque, moments, power and contamination of lubrication oil, and the like), environmental data (e.g., temperature, pressure, altitude, weather, and the like), and flight data (e.g., aerodynamic forces, vibration, speed, and the like) obtained from sensors onboard the aircraft, such as sensors 42 shown in FIG. 1.

When it is desired to retrieve the updated TBO value from the LRU or LRUs included in LRU prognostic system 10 (FIG. 1), the memories contained with the RFID tags can be accessed through controller 32, a gateway device (FIG. 3), or another intermediary device. Alternatively, the memories contained within the RFID tags can be accessed directly utilizing either wireless connection or a physical interface. In preferred implementations, a technician utilizes an RFID scanner to access the RFID memories directly, a RFID scanner. The term "RFID scanner," as appearing herein, encompasses dedicated handheld devices, RFID-compatible smart phones, RFID-enabled tablet and laptop computers, and any other device capable of wirelessly receiving data from an RFID module in the manner described herein. An example of a dedicated RFID scanner suitable for usage in the below-described process is the INTERMEC-brand reader commercially marketed by HONEYWELL® Scanning and Mobility (a company). In certain embodiments, the range of RFID antenna 20 (FIG. 1) may be intentionally limited to a relatively small radius (e.g., on the order of 1-2 meters) to reduce the likelihood of inadvertent reception by a passenger's mobile phone or other unauthorized device.

The foregoing has thus provided embodiments of an aircraft prognostic system that functions to establish an adaptive TBO value for one or more LRUs. In an embodiment, the aircraft prognostic system monitors the cumulative period of time the aircraft operates in any one of a plurality of different geographically-divided zones, each of which has a particular LRU degradation rate associated therewith. The environmental degradation rates correlated to the geographical zones may be LRU-specific and recalled from a memory embedded in the LRU. Additionally, in certain embodiments, the degradation rates can be adjusted based upon sensor data estimating the degradation of the LRU. The adaptive TBO value may then be stored on, for example, memories affixed to each LRU and, preferably, memories included in RFID modules embedded into each LRU. In this manner, the adaptive TBO value can be readily retrieved from the LRU even in instances wherein the LRU is deployed on multiple different aircraft over its operational lifespan.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrange-

What is claimed is:

1. A Line Replaceable Unit (LRU) prognostic system, comprising:
a first LRU;
an aircraft position data source configured to monitor a position of an aircraft carrying the LRU prognostic system;
an environmental zone database storing a range of aircraft positions correlated with a plurality of different environmental zones and further storing degradation rates for at least one of a group consisting of a high humidity zone, a desert zone, a saline zone, and an ice-rich zone; and
a controller coupled to the first LRU, to the aircraft position data source, and to the environmental zone database, the controller configured to: (i) estimate a degradation of the first LRU based, at least in part, on a duration of time the aircraft position resides in one or more of the plurality of different environmental zones while the aircraft is operational, as determined utilizing aircraft position and the environmental zone database, and (ii) calculate an adaptive Time Between Overhaul (TBO) value for the first LRU utilizing the estimated LRU degradation.

2. The LRU prognostic system of claim 1 further comprising a memory storing degradation rates for the plurality of different environmental zones, the controller configured to estimate the degradation of the first LRU as a function of duration of time the aircraft position resides in the plurality of different environmental zones and the corresponding degradation rates.

3. The LRU prognostic system of claim 2 wherein the memory is embedded in the first LRU.

4. The LRU prognostic system of claim 2 further comprising a sensor configured to monitor a parameter affecting the degradation rate of the first LRU, the controller coupled to the sensor and configured to vary one or more of the degradation rates stored in the memory based upon data provided by the sensor.

5. The LRU prognostic system of claim 1 further comprising an LRU memory affixed to the first LRU, the controller coupled to the LRU memory and further configured to store the adaptive TBO value in the LRU memory.

6. The LRU prognostic system of claim 5 further comprising:
a Radio Frequency Identification (RFID) module embedded in the first LRU and containing the LRU memory; and
an RF transceiver coupled to the controller and enabling wireless communication with the RFID module.

7. The LRU prognostic system of claim 5 wherein the controller is operable in a shutdown mode during which the controller updates the adaptive TBO value during shutdown of the aircraft.

8. The LRU prognostic system of claim 5 wherein the LRU memory further stores a baseline TBO value therein, and wherein the controller is configured to determine the adaptive TBO value from the baseline TBO value and the estimated LRU degradation.

9. The LRU prognostic system of claim 1 wherein the controller is operable in a power-up mode during which the controller determines the present aircraft position and current time from the aircraft position data source.

10. The LRU prognostic system of claim 9 wherein the controller is further operable in an in-flight mode during which controller periodically: (i) determines the present aircraft position and current time from the aircraft position data source, and (ii) calculates a cumulative time period during which the aircraft resides in the plurality of different environmental zones.

11. A Line Replaceable Unit (LRU) prognostic system deployable on an aircraft, the LRU prognostic system comprising:
a first LRU;
a first Radio Frequency Identification (RFID) module affixed to the first LRU, the first RFID module containing an LRU memory storing a baseline Time Between Overhaul (TBO) value, LRU degradation rates corresponding to a plurality of different environmental zones, and an adaptive TBO value; and
a calculation sub-system coupled to the first RFID module and configured to periodically update the adaptive TBO value by: (i) estimating a degradation of the first LRU based at least in part on a duration of time an aircraft position resides in the plurality of different environmental zones and LRU degradation rates associated with the plurality of different environmental zones, as recalled from the RFID module, (ii) calculating a new adaptive TBO value from the estimated LRU degradation, and (iii) storing the new adaptive TBO value in the LRU memory.

12. The LRU prognostic system of claim 11 wherein the calculation sub-system is configured to update the adaptive TBO value in response to shut-down of the aircraft.

13. The LRU prognostic system of claim 11 wherein the calculation sub-system comprises:
a Global Positioning System (GPS) device configured to monitor a current aircraft position;
an environmental zone database storing information correlating the plurality of different environmental zones with a range of aircraft positions; and
a controller coupled to the GPS device and to the environmental zone database, the controller configured to determine the duration of time the aircraft position is located in the plurality of different environmental zones by periodically comparing the current aircraft position with the information stored in the environmental zone database.

14. The LRU prognostic system of claim 11 further comprising:
a second LRU; and
a second RFID module affixed to the second LRU and containing a second LRU memory storing a second baseline TBO value for the second LRU, LRU degradation rates corresponding to the plurality of different environmental zones for the second LRU, and a second adaptive TBO value for the second LRU;
wherein the controller is coupled to the second RFID module and is further configured to periodically update the second adaptive TBO value stored in the second LRU memory of the second LRU.

15. The LRU prognostic system of claim 14 further comprising a gateway device through which the calculation sub-system wirelessly communicates with the first RFID module and the second RFID module.

16. The LRU prognostic system of claim 14 wherein the LRU degradation rates stored in the second RFID module differ relative to the LRU degradation rates stored in the first RFID module.

17. A Line Replaceable Unit (LRU) prognostic system, comprising:
 a first LRU;
 an aircraft position data source configured to monitor a position of an aircraft carrying the LRU prognostic system;
 a controller coupled to the first LRU and to the aircraft position data source, the controller configured to: (i) estimate a degradation of the first LRU based, at least in part, on a duration of time the aircraft position resides in at least one of a plurality of different environmental zones while the aircraft is operational, and (ii) calculate an adaptive Time Between Overhaul (TBO) value for the first LRU utilizing the estimated LRU degradation; and
 a Radio Frequency Identification (RFID) module affixed to the first LRU, the RFID module comprising:
  an LRU memory in which the adaptive TBO value is stored; and
  a first Radio Frequency (RF) transceiver enabling wireless communication with the RFID module.

18. The LRU prognostic system of claim 17 wherein the RFID module is embedded within the first LRU.

19. The LRU prognostic system of claim 17 wherein the controller is further configured to estimate the degradation of the first LRU utilizing LRU degradation rates corresponding to the plurality of different environmental zones.

20. The LRU prognostic system of claim 19 wherein the LRU degradation rates are stored in the LRU memory of the RFID module.

* * * * *